G. W. COLLIN.
STEAM STRAINER.
APPLICATION FILED JULY 8, 1911.
1,033,544.
Patented July 23, 1912.
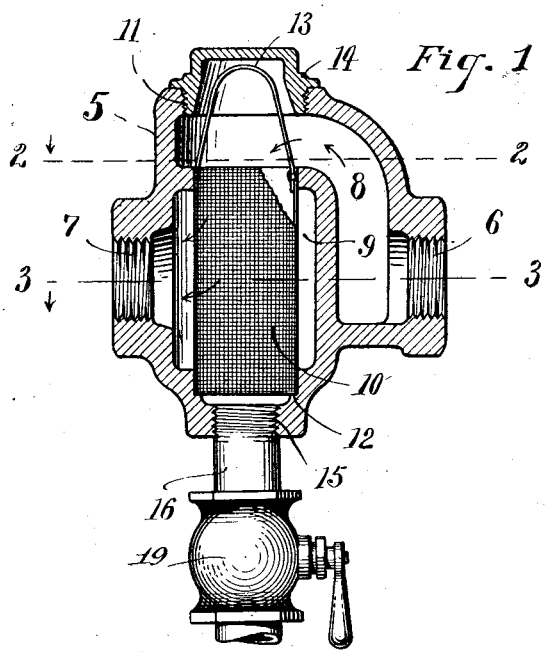
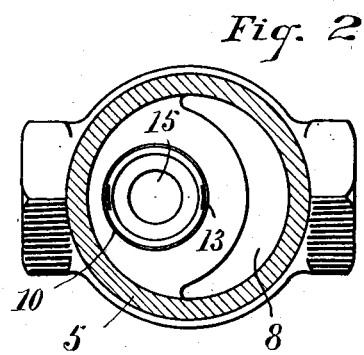
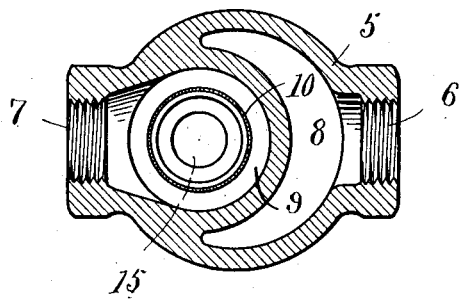
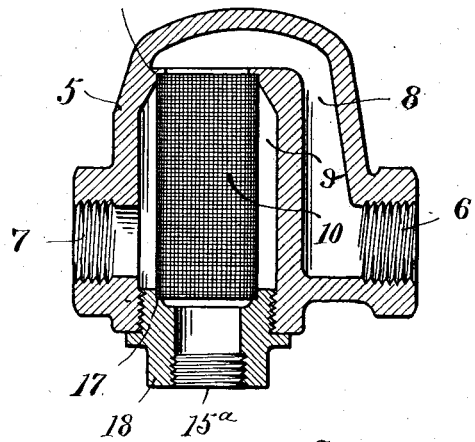
Witnesses
Joan L. Morehouse
Ruth M. Wooden
Inventor
George W. Collin
By Chamberlain & Newman
Attorneys

UNITED STATES PATENT OFFICE.

GEORGE W. COLLIN, OF BRIDGEPORT, CONNECTICUT.

STEAM-STRAINER.

1,033,544.   Specification of Letters Patent.   Patented July 23, 1912.

Application filed July 8, 1911. Serial No. 637,491.

*To all whom it may concern:*

Be it known that I, GEORGE W. COLLIN, citizen of the United States, and resident of Bridgeport, in the county of Fairfield and State of Connecticut, have invented certain new and useful Improvements in Steam-Strainers, of which the following is a specification.

This invention relates to new and useful improvements in strainers, such as are inserted and used in a live steam pipe line, and thus employed to catch the dirt and other foreign matter carried thereto by the action of the steam.

The object of the invention is to provide a very simple and effective form of strainer which is especially designed for separating the solid matter, such as scale, dirt and other foreign substances from live steam, air, gas, water, oil, &c., as it is being conveyed through a line of pipe, as for instance in the matter of steam from a steam boiler to a heating system; to provide a steam strainer for the above purposes whose actual area of openings for the passage of steam is several times more than the area of the opening of the inlet and outlet to the strainer, and whereby the flow of steam through the strainer and the pipe line with which it may be connected, will not be retarded by the lodging therein of a limited amount of dirt; and finally to provide a steam strainer of the above class which may be readily cleaned by the action of the steam itself and without necessarily removing the strainer from its connected pipe line.

With these and other objects in view the invention consists in the construction and novel combination and arrangement of parts hereinafter fully described, illustrated in the accompanying drawings, and pointed out in the claims hereto appended, it being understood that various changes in the form, proportion, and construction, within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1, shows a central vertical longitudinal section through my improved steam strainer complete. Fig. 2, is a sectional plan view, taken on line 2—2 of Fig. 1. Fig. 3, is a longitudinal sectional plan view taken on line 3—3 of Fig. 1, and Fig. 4, is a further central vertical longitudinal sectional view somewhat similar to Fig. 1, but illustrating a slightly different form of construction.

Referring in detail to the characters of reference marked upon the drawings, 5 represents a special form of body which is provided with an inlet 6 upon one side and an outlet 7 in the other side. This outlet is connected with the inlet by a steam passage 8 and the strainer compartment 9 which latter is of a general cylindrical form and arranged vertically and substantially central in the body and at a right angle to the inlet and outlet. The steam passage 8 from the inlet connects with the one end of the strainer compartment 9, while the side outlet connects with the said enlarged strainer compartment. The strainer 10 is preferably made of very fine wire gauze or perforated sheet bronze, and is of a cylindrical form being entirely open at each end and of a lesser diameter than that of the opening 11 through which it is placed in the body. This cylinder is thus located in the compartment 9 before mentioned, as shown in Figs. 1, 2 and 3, being seated against an annular shoulder 12 of the body, and is provided with a loop form of handle 13 whereby it may be set into or lifted out of the compartment through the said opening as occasion may require for repairs or the like. A removable plug 14 incloses the top opening 11 as shown in Fig. 1, said opening being in line with the strainer and its compartment. The discharge opening 15 is in line with the lower end opening of the screw and thus insures a free and direct discharge of steam from the strainer when it is desirable to clean the same. The normal line of travel of the steam through the strainer is in the direction of the arrows and thus enters the upper open end of the strainer and goes out through the sides, thereby catching the solid dirt against the inner wall of the screen. Should this tubular screen become sufficiently filled or clogged with dirt to retard the flow of steam or cause trouble, the screen may be cleaned in a few minutes by opening a cock 19, located in the discharge pipe 16 and connected with the lower opening 15 of the body, which serves to blow out the tubular screen with the live steam, in a manner to thoroughly clean the screen and without removing the same. In practice we place the blow oil cock in pipe 16, as far from the strainer as practical, which makes the pipe between the cock and the strainer act as a trap for oil and water, which being heavier than the steam naturally settles therein from the passing steam.

In the construction shown in Fig. 4 I have omitted the top opening and inserting the tubular screen in from the bottom, and hold it in place between the shoulder 12 in top of the body and a similar annular shoulder 17 in the inner end of a bottom plug 18 having a threaded hole 15ª therethrough that serves for the attachment of the blow out pipe 16 and its cock 19.

Having thus described my invention what I claim and desire to secure by Letters Patent is:

1. A steam strainer of the class described, the same comprising an elongated body provided with a side inlet and provided with a suitable screen chamber having a port leading from the side inlet of the body into one end of the chamber and a side outlet from the chamber, a blowout opening in the other end of the screen chamber, an elongated cylindrical screen within the said chamber and arranged intermediate of and in alinement with the inlet and blowout so as to insure the steam entering from the side and passing up and in the open end of the screen and out through the sides to the side outlet, and also adapted to blow directly through the cylindrical screen and out through its end when opened to clean the screen, and a removable plug fitted in a hole of the body in line with the end of the cylindrical screen to permit the withdrawal of the same.

2. A steam strainer of the class described, the same comprising a body provided with a suitable screen chamber having side inlets and outlets and an end hole for the introduction of a screen, a blowout opening in another end of the body, a single removable elongated cylindrical screen within the said chamber and arranged intermediate of and in alinement with the end hole and intermediate of the said inlet and outlet and so as to insure the steam normally entering the side of the body and passing in the open end of the screen and passing out through the sides thereof, and means to direct the steam to blow directly through its open end when it is desired to clean the screen.

Signed at Bridgeport in the county of Fairfield and State of Connecticut this 27 day of June A. D., 1911.

GEORGE W. COLLIN.

Witnesses:
C. M. NEWMAN,
E. EARLE GARLICK.